Feb. 26, 1963 J. D. LANGWELL 3,078,558
METHOD OF AND APPARATUS FOR MANUFACTURING SLIDE FASTENERS
Filed June 8, 1960 15 Sheets-Sheet 1

INVENTOR
JOHN D. LANGWELL
BY
ATTORNEY

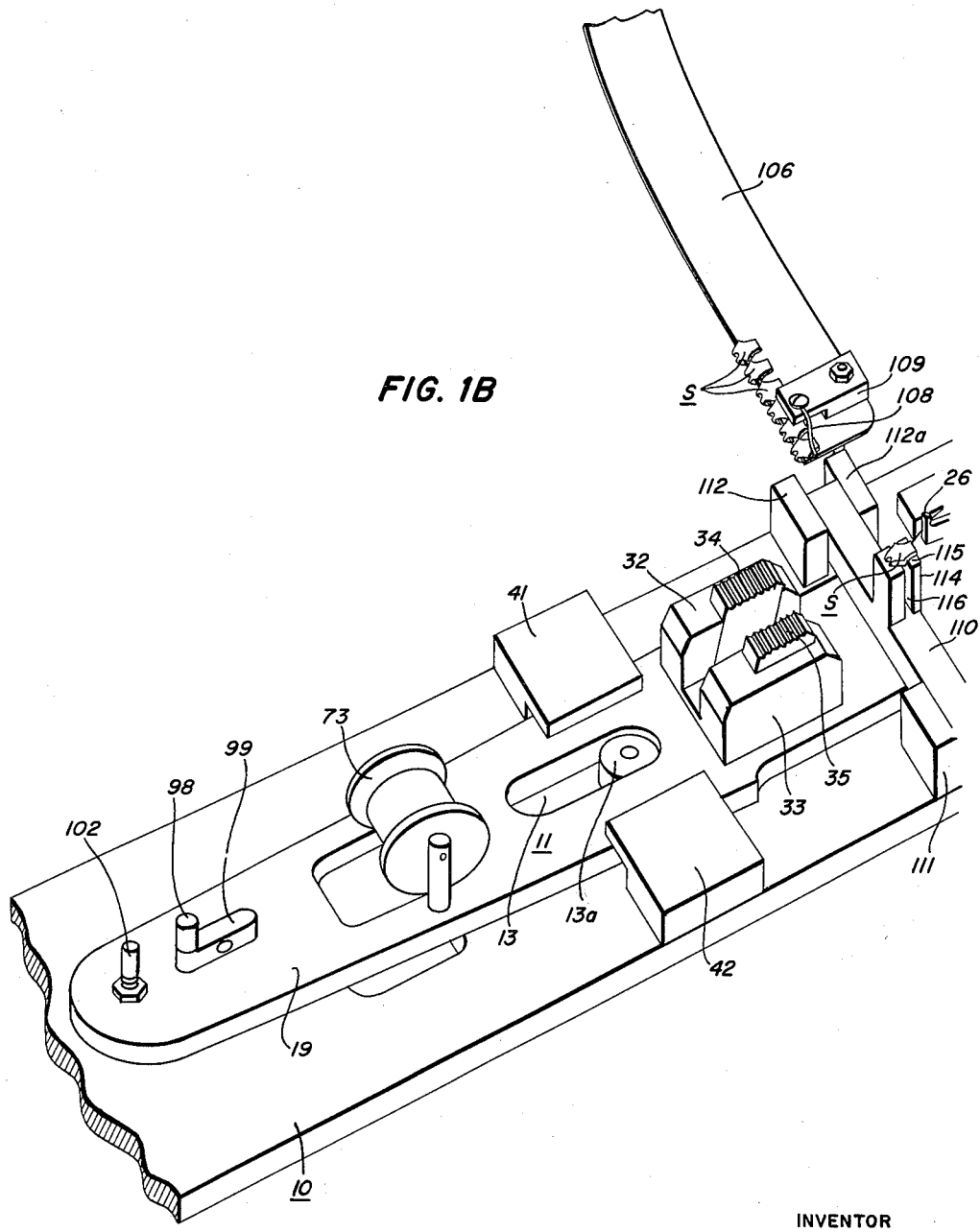

INVENTOR
JOHN D. LANGWELL

INVENTOR
JOHN D. LANGWELL
ATTORNEY

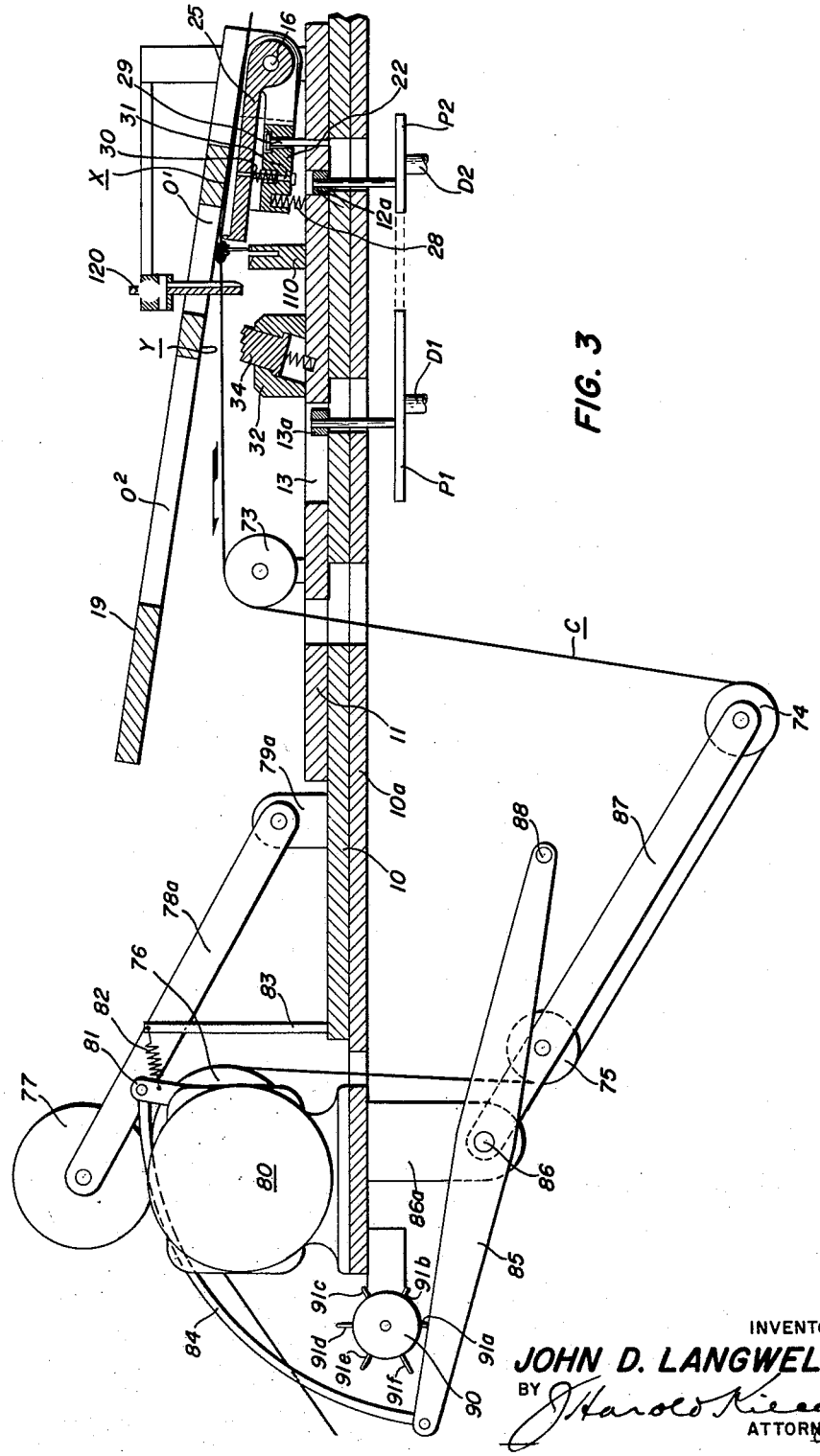

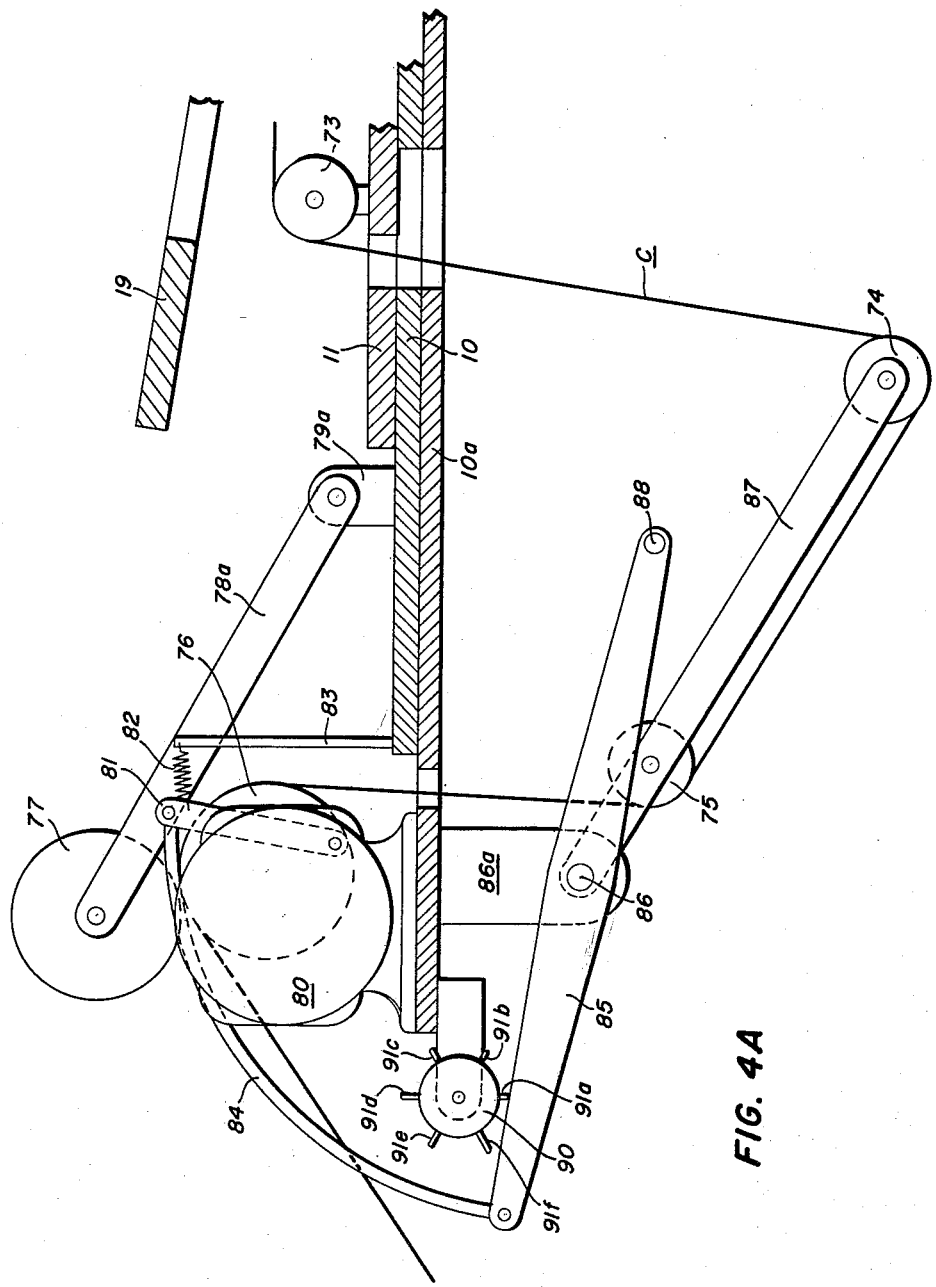

Feb. 26, 1963   J. D. LANGWELL   3,078,558
METHOD OF AND APPARATUS FOR MANUFACTURING SLIDE FASTENERS
Filed June 8, 1960   15 Sheets-Sheet 7
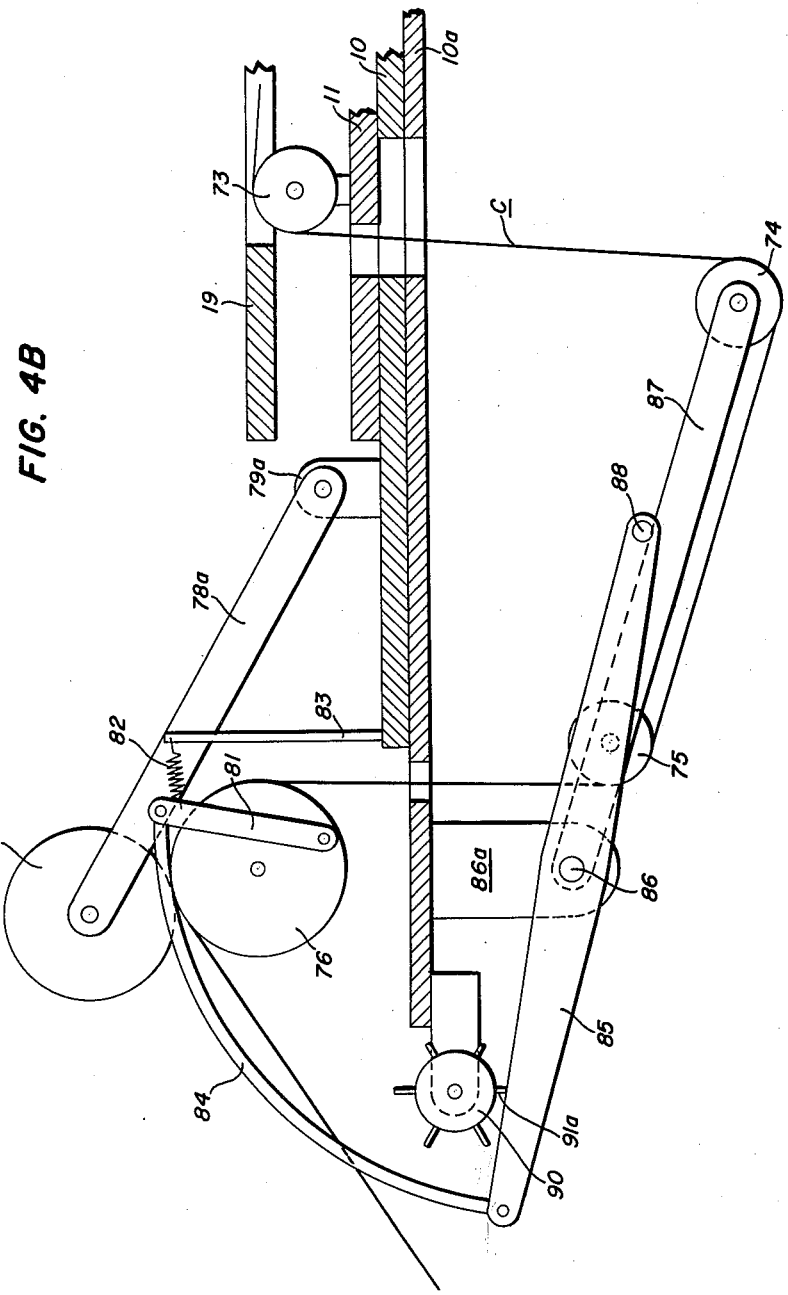
INVENTOR
JOHN D. LANGWELL
BY
ATTORNEY

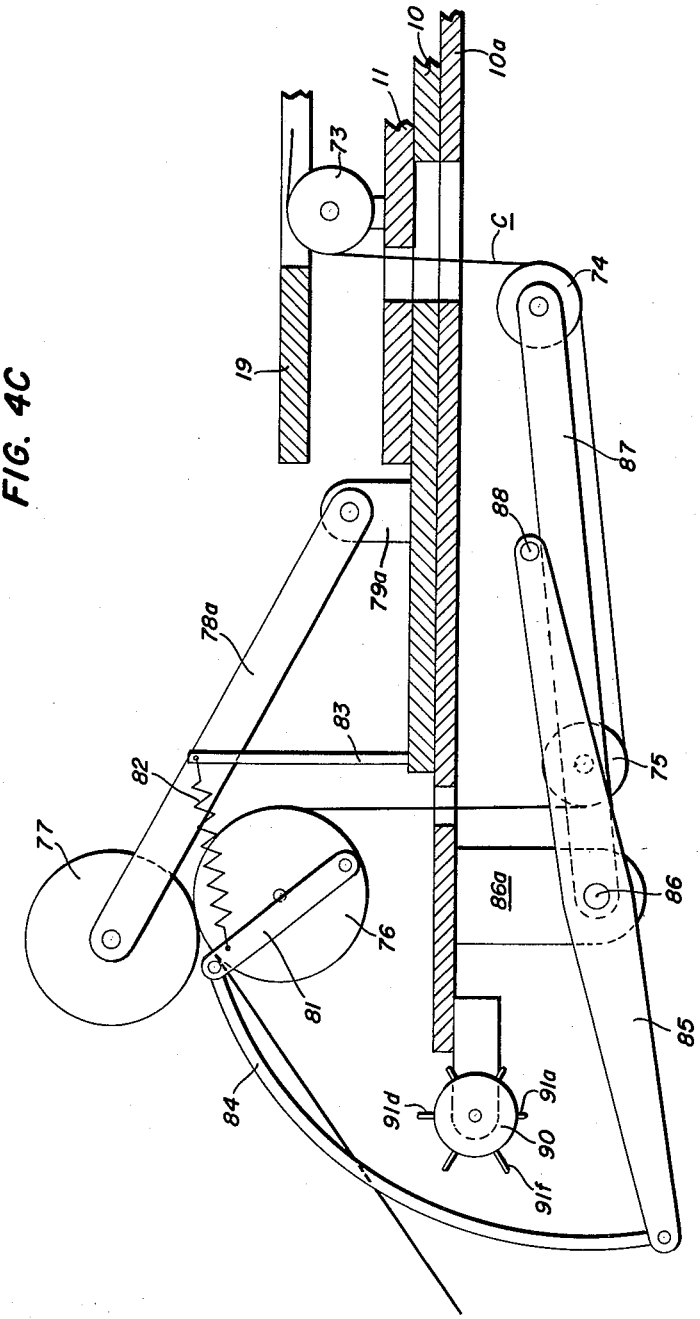

Feb. 26, 1963 J. D. LANGWELL 3,078,558
METHOD OF AND APPARATUS FOR MANUFACTURING SLIDE FASTENERS
Filed June 8, 1960 15 Sheets-Sheet 9

INVENTOR
JOHN D. LANGWELL
BY
ATTORNEY

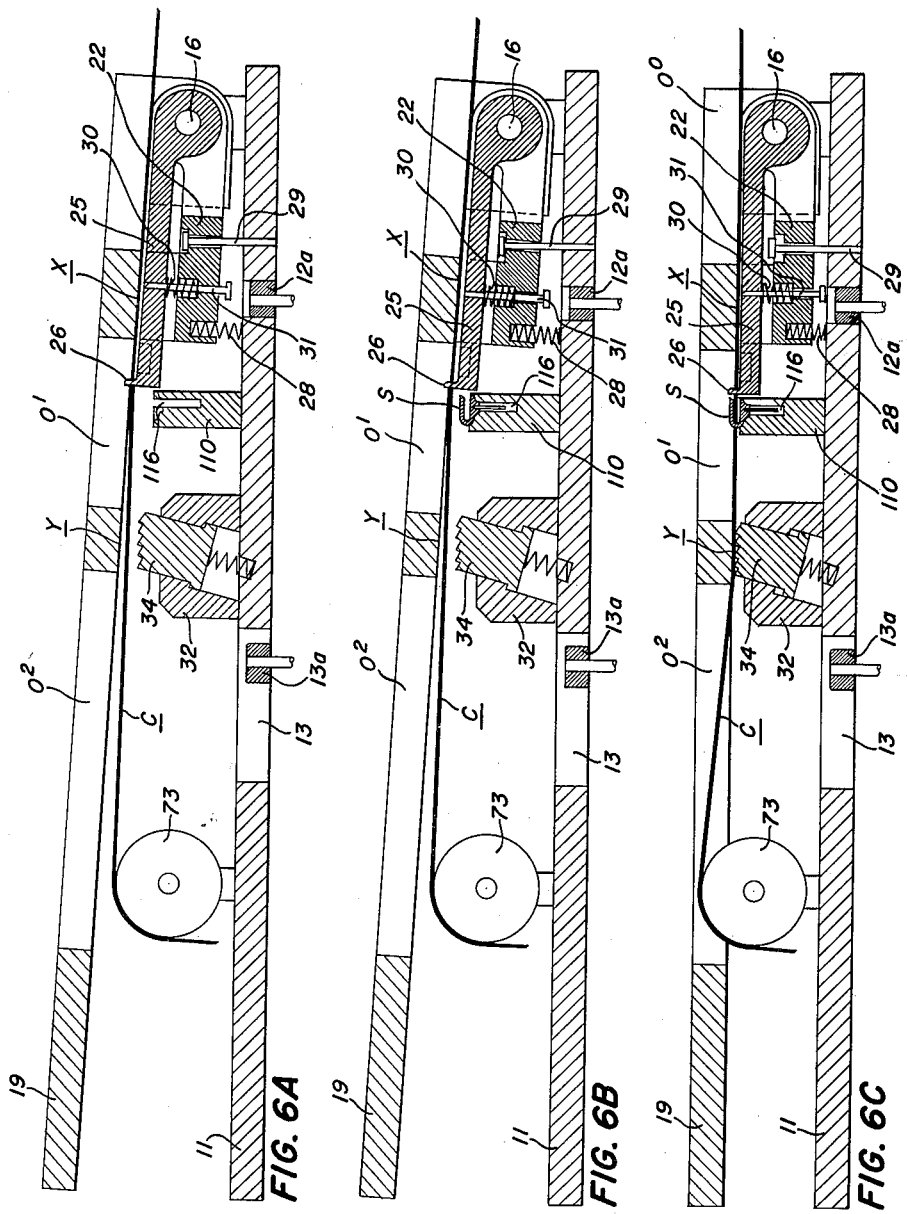

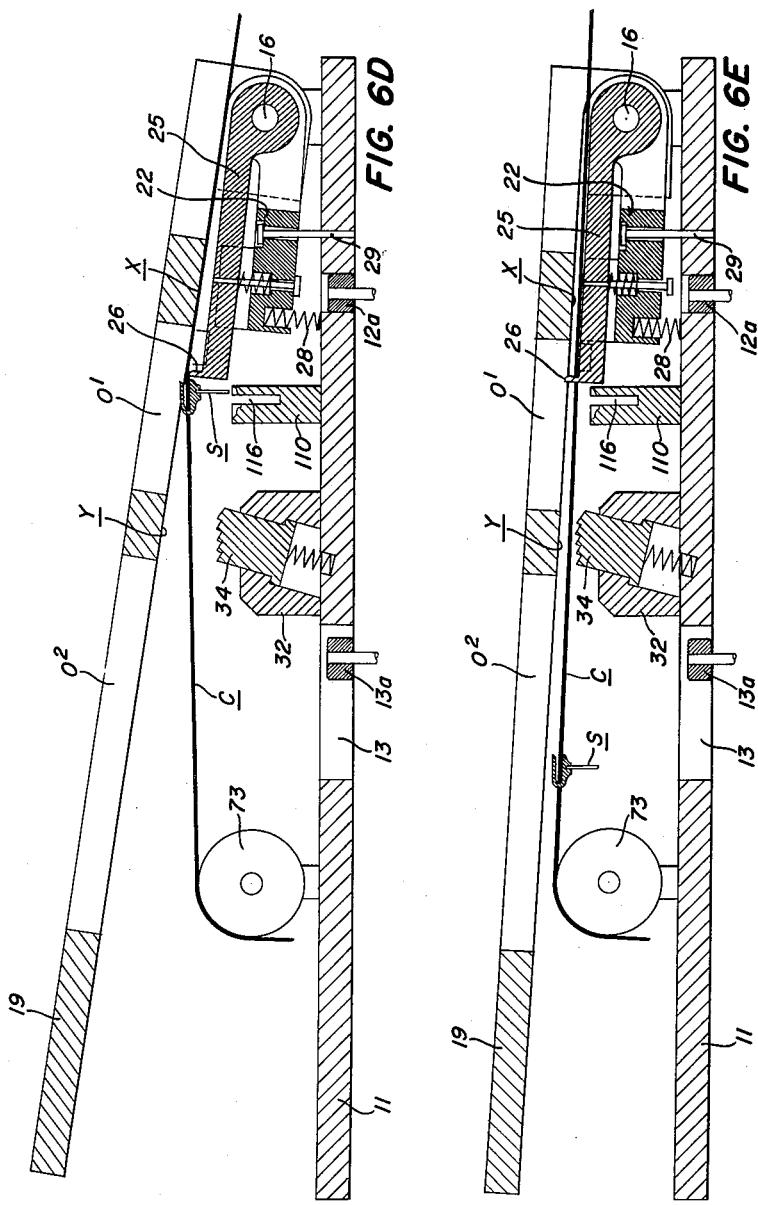

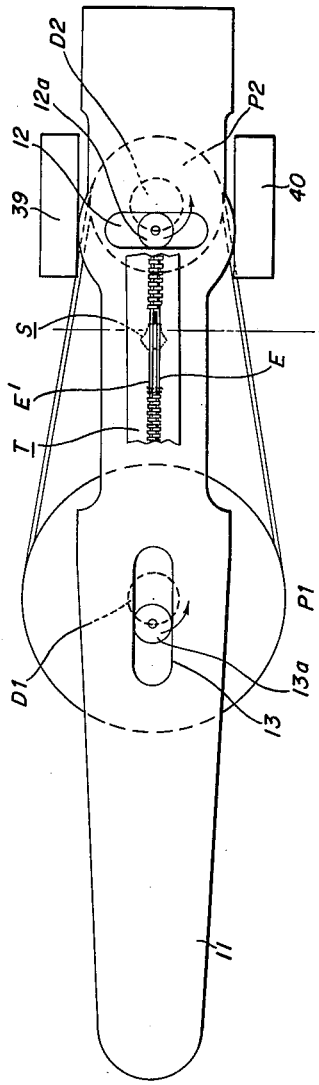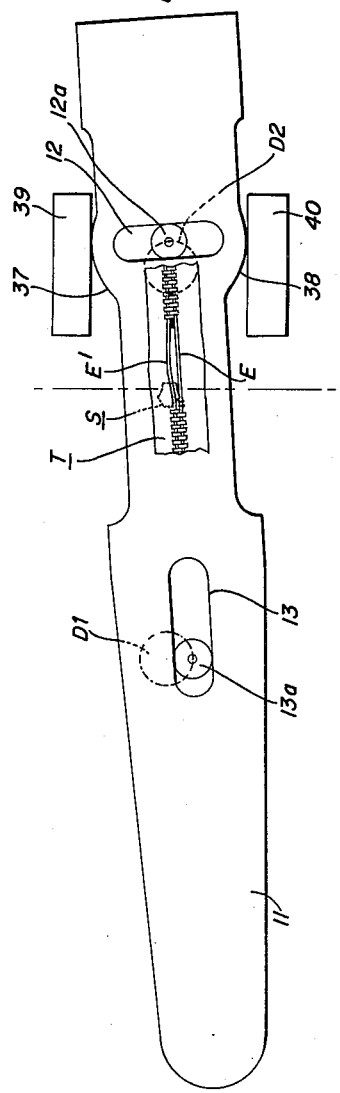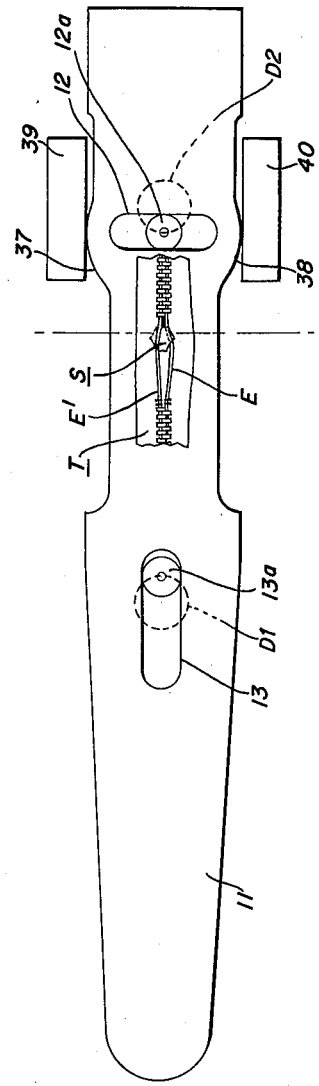

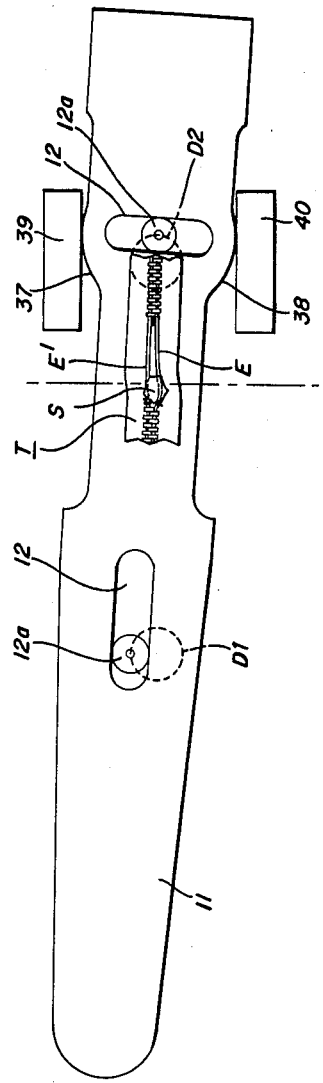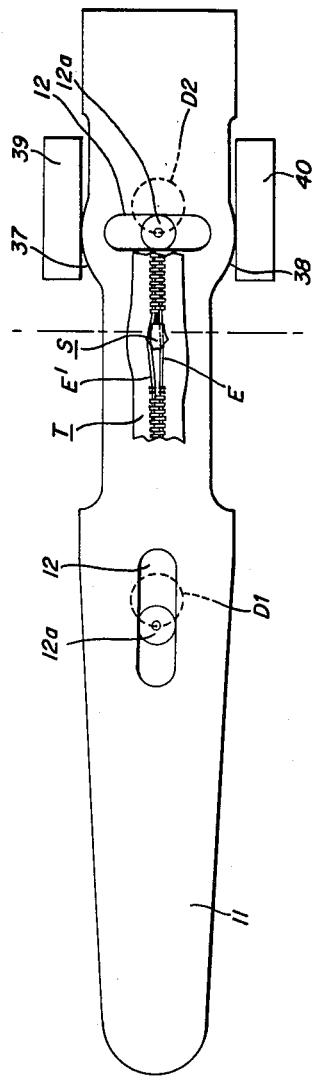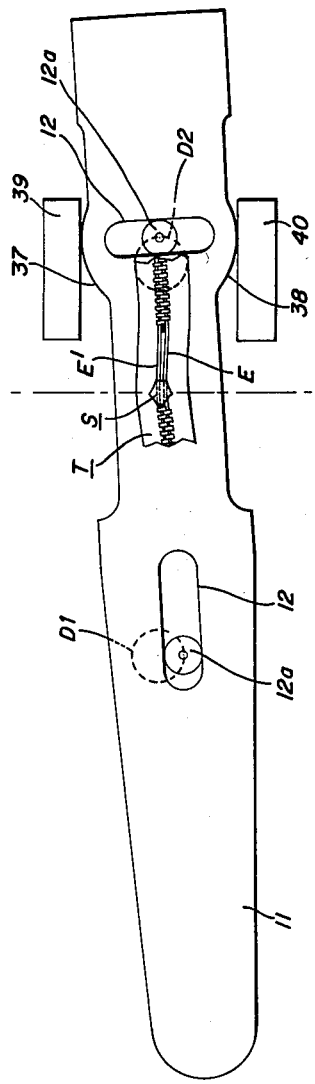

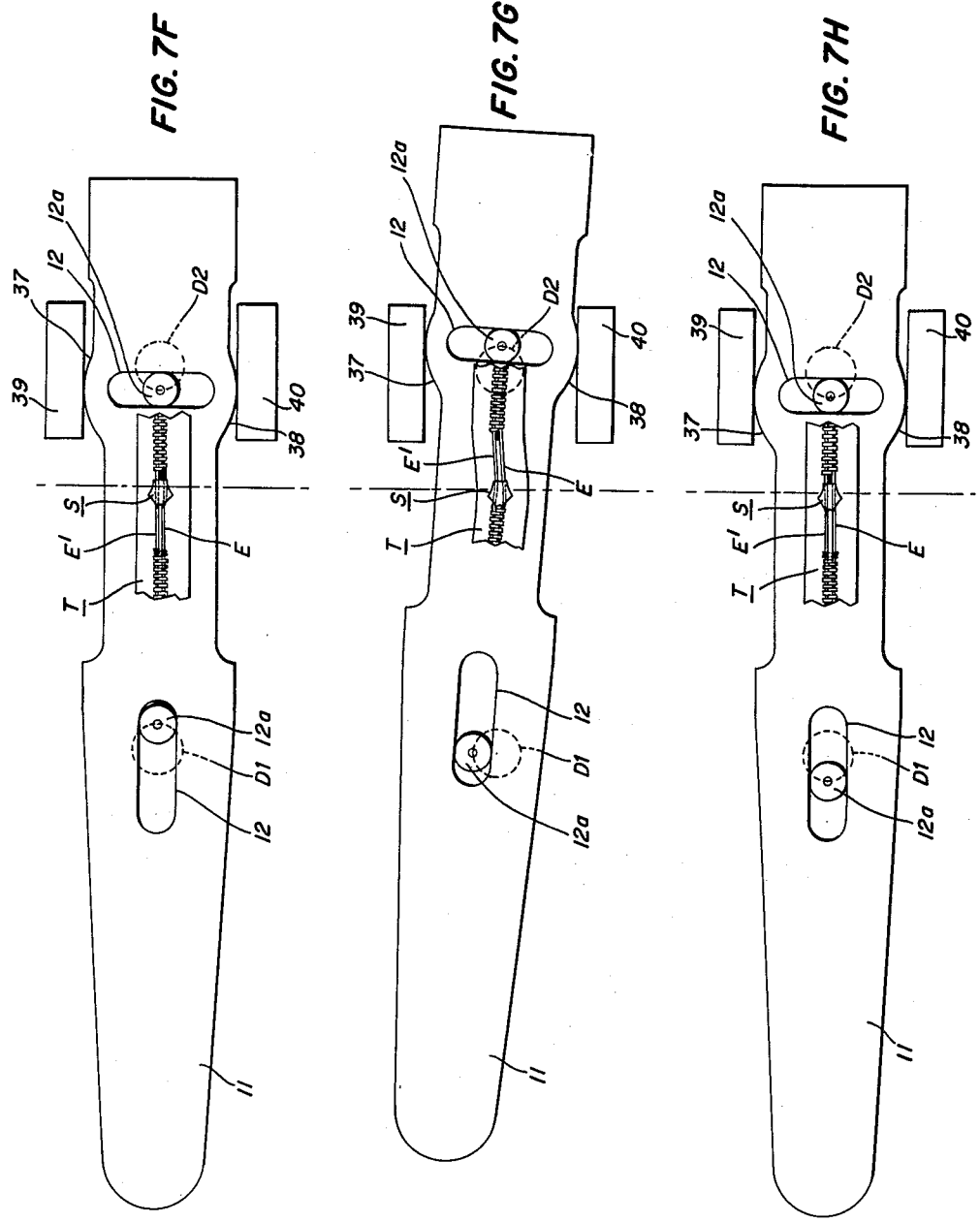

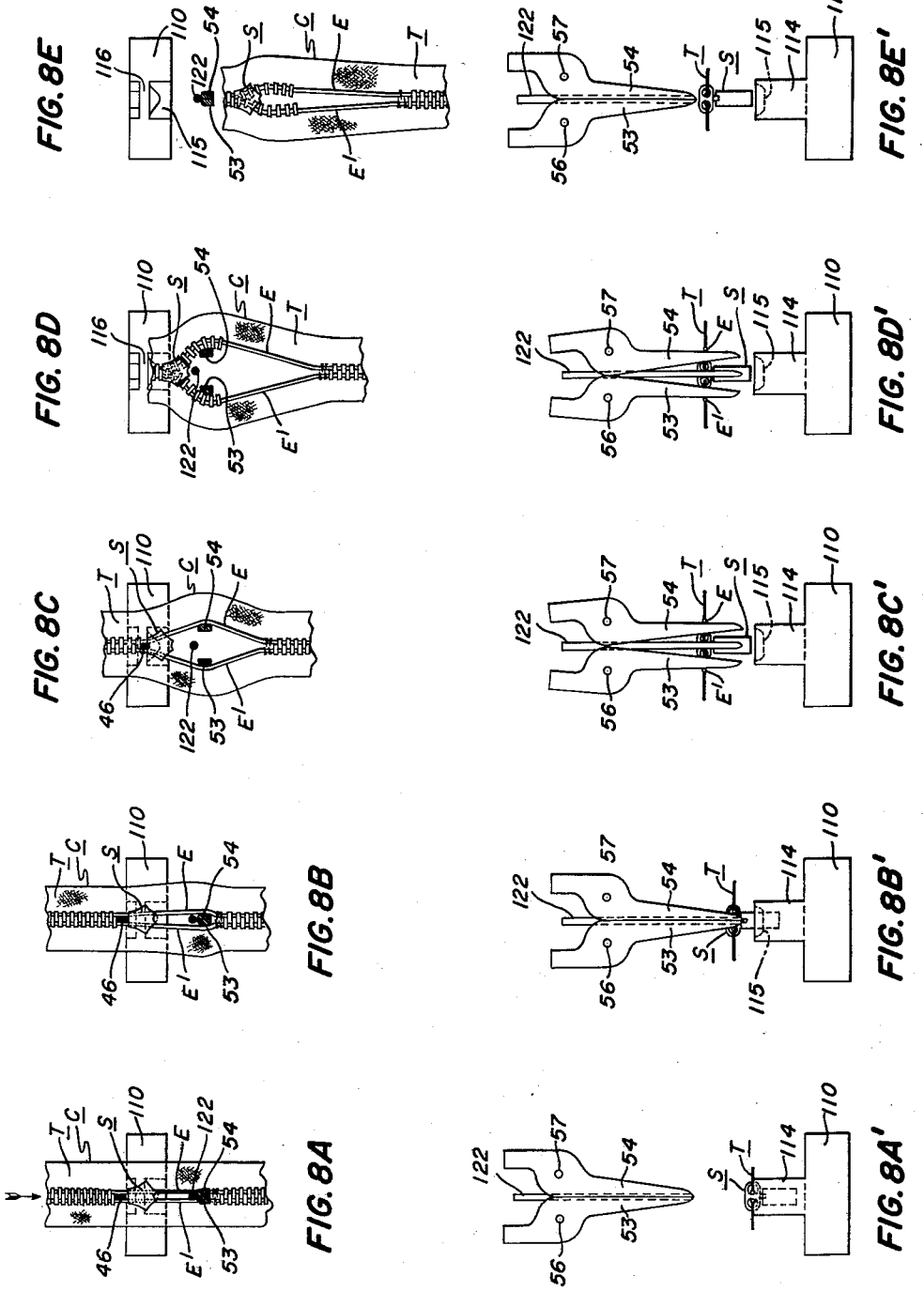

3,078,558
METHOD OF AND APPARATUS FOR MANUFACTURING SLIDE FASTENERS
John D. Langwell, Freeport, N.J., assignor to Waldes Kohinoor, Inc., Long Island City, N.Y., a corporation of New York
Filed June 8, 1960, Ser. No. 34,839
20 Claims. (Cl. 29—408)

This invention relates to improvements in methods of and apparatus for manufacturing slide fasteners, and more particularly to an improved method and apparatus for automatically applying sliders to the slide fasteners or zippers of a continuous chain thereof, as the latter term is used herein to mean a multiplicity of individual slide fasteners or zippers serially arranged on the same continuous tapes and which are spaced from one another by short length tape portions free of fastener elements which, upon severance, form the element-free extensions conventionally provided at the ends of individual slide fasteners or zippers.

It is of course well known to manufacture individual slide fasteners complete with bottom and top stops and slider from a continuous chain of slide fasteners as aforesaid, but mostly the sliders are applied or attached by hand to the serially connected individual slide fasteners, and to a lesser degree by combined hand and machine operations. In either case, slider application was time-consuming and laborious and hence resulted in a substantial slowing down of the otherwise high-speed slide fastener manufacturing operation and a corresponding increase in the cost of the finished slide fasteners to the purchaser.

Stated broadly, an object of the present invention is the provision of a high speed yet effective and thoroughly dependable method of applying sliders to the succession of individual slide fasteners of a continuous chain thereof as the latter moves along a longitudinal path.

Another major object of the invention is the provision of simple apparatus for effectively implementing the aforesaid method.

More particularly, the invention contemplates and provides high speed, precision apparatus for automatically applying sliders to the succession of slide fasteners of a continuous chain thereof moving longitudinally through the same.

Another important object of the invention is the provision of apparatus which completely mechanizes the operation, usually performed by hand or by a combination hand and machine procedure, of applying the sliders to a plurality of individual slide fasteners or zippers mounted on continuous tapes, as said chain of slide fasteners moves through said apparatus.

The above and other objects and features of advantage of the improved method of and apparatus for automatically applying sliders to the individual slide fasteners or zippers of a continuous chain thereof according to the present invention will be best understood from the following detailed description thereof, in which reference is had to the accompanying drawings, wherein:

FIGS. 1A and 1B are partial perspective views which taken together illustrate certain major parts and arrangements of the slider-applying apparatus as herein proposed, the view showing the upper chain-clamping arm in its inactive position;

FIG. 3 is a longitudinal section taken through the entire apparatus, i.e. the apparatus illustrated in FIGS. 1A–2B, inclusive, plus the continuous-chain feed means but minus the other parts such as the slider feed means;

FIGS. 4A, 4B and 4C are longitudinal section views taken through the continuous-chain feed and feed control means which illustrate the weighted loop-forming roller element in its lowermost, intermediate and full raised positions, respectively;

FIGS. 6A–6E are longitudinal section views taken through the relatively rearward (right-hand) end of apparatus according to the invention, which illustrate the chain tensioning, clamping, lowering and freeing action of the upper clamping arm and related parts according to their different angular positions;

FIG. 7 is a plan view looking down on the so-called carriage and the means for imparting compound longitudinal and sidewise movement thereto as effects threading of the inner edges of the individual tapes of each of the element-free tape portions of a continuous chain through the side openings and thence into the channel of a slider positioned to receive same;

FIGS. 7A–7H are diagrammatic views which illustrate the various stages of the aforesaid threading operation, it being noted that FIG. 7H illustrates the parts in their cycle ending and/or starting position according to FIG. 7;

Figure 1A:
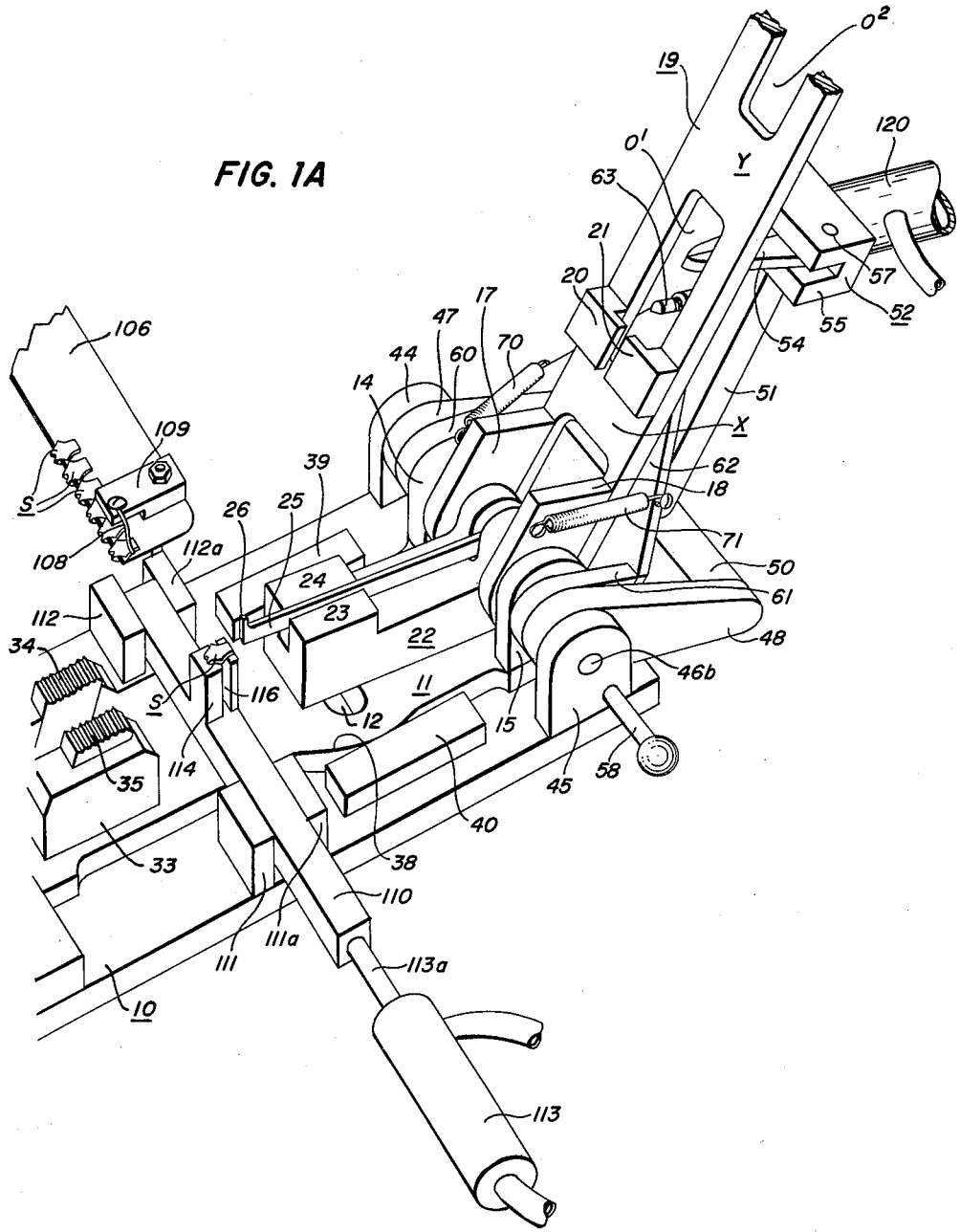

FIGS. 8A–8E are diagrammatic views detailing the various stages of effecting spreading of the individual tapes which have been threaded into a slider channel as aforesaid at points forwardly of the slider, as effects movement of the slider onto the end portion of the next following or trailing slide fastener of the continuous chain; and FIGS. 8A′–8E′ are elevational views corresponding to FIGS. 8A–8E, respectively, which illustrate the tape spreading means in front elevation.

In the interest of simple disclosure, the improved method of and apparatus for applying sliders to a continuous chain of individual slide fasteners separated by approximately double-length, element-free tape portions according to the invention will first be generally described and thereafter more specifically described, as follows:

*General Description*

Basically, the invention provides for the threading of the inner edges of the individual tapes of each element-free tape portion extending between every two adjacent slide fasteners of a continuous chain thereof into the channel of a slider stationarily held in a predetermined horizontal position below said tape portion, in which its rear wing is disposed upwardly (whereby its pull tab may depend downwardly to an out-of-the-way position), its mouth end is forwardly disposed and its center line is in parallelism with that of the continuous chain, whereby the side openings of the slider open to the opposite sides of the chain. Considering for the moment only the tape-into-slider-channel threading operation, such is effected by lowering said element-free tape portion after it has been tensioned and its ends positively clamped so as to prevent any uncontrolled movement of the individual tapes making up same, against the upwardly disposed rear wing of the slider and simultaneously shifting said tape portion a small distance in both longitudinal and sidewise directions as brings the inner edge of one of the individual tapes to the side of the slider and at the level of the corresponding side opening thereof. Thereupon, the tensioned tape portion is shifted back to its original longitudinal and "on-center" relationship with respect to the slider, as effects movement of said lowered tape edge through said side opening and finally into the slider channel. Thereupon, the aforesaid operations are repeated for the inner edge of the other individual tape as results in said other inner edge also moving into the slider channel.

With both inner tape edges of the tape portion being acted on now threaded into the slider channel, said edges are positively spread apart at corresponding points disposed slightly forwardly of the slider. Such results in the slider moving relatively rearwardly onto the end of the immediately following slide fastener of the chain which completes the cycle.

Not only is the aforesaid plural tapes into-slider-channel threading operation performed automatically, but also the invention provides for the automatic feed of the continuous chain so as to present successive element free portions thereof to sliders fed one at a time into position to be applied thereto, and full automatic control and coordination of both fastener chain and slider feed as insures high-speed precision application of a slider to each of the slide fasteners or zippers making up the continuous chain thereof as the latter is fed intermittently along its path of movement. Thus, assuming that the bottom stops have been applied to the individual slide fasteners of the chain prior to application of the sliders thereto by the herein proposed method and apparatus, the continuous chain of slide fasteners having sliders applied thereto moving forwardly, i.e. discharging, from the present apparatus constitutes a succession of substantially complete, commercial slide fasteners inasmuch as their completion requires only the application of the top stops thereto and severance of the individual slide fasteners from the chain thereof.

*Detailed Description*

Referring to FIGS. 1A–3, inclusive, the slider-to-slide fastener applying means according to the invention, considered as a piece of apparatus, comprises a machine base or bed plate 10 shown as resting on a table or other appropriate horizontal support 10a and mounting an elongated slide carriage 11 (shown in detail in FIGS. 7–7H inclusive), to which limited longitudinal and sidewise motion is imparted as by means of eccentrics 12a, 13a operating in respective openings 12 and 13, provided therefor in the carriage, and being driven from pulleys P1 and P2 powered by drive shafts D1 and D2 as generally illustrated in FIG. 3. Inasmuch as the direction of fastener chain feed is from right to left, the right end of the apparatus will be hereinafter considered and referred to as the rearward end and the left end as the forward end.

At its rearward end, the carriage 11 mounts a laterally-spaced pair of upright bearing ears 14, 15 in which is journalled an inside cross shaft 16 which extends through depending laterally spaced bearing ears 17, 18, provided at the relatively rearward end and underface side of an elongated, forwardly extending upper clamping arm or bridge 19. Thus, said upper clamping arm 19 partakes of the motion of the carriage and is moreover swingable from an inactive or non-operating position in which it is shown in FIG. 1A to an operating position in which it is shown in FIGS. 2A and 3, for example.

Figure 2A:
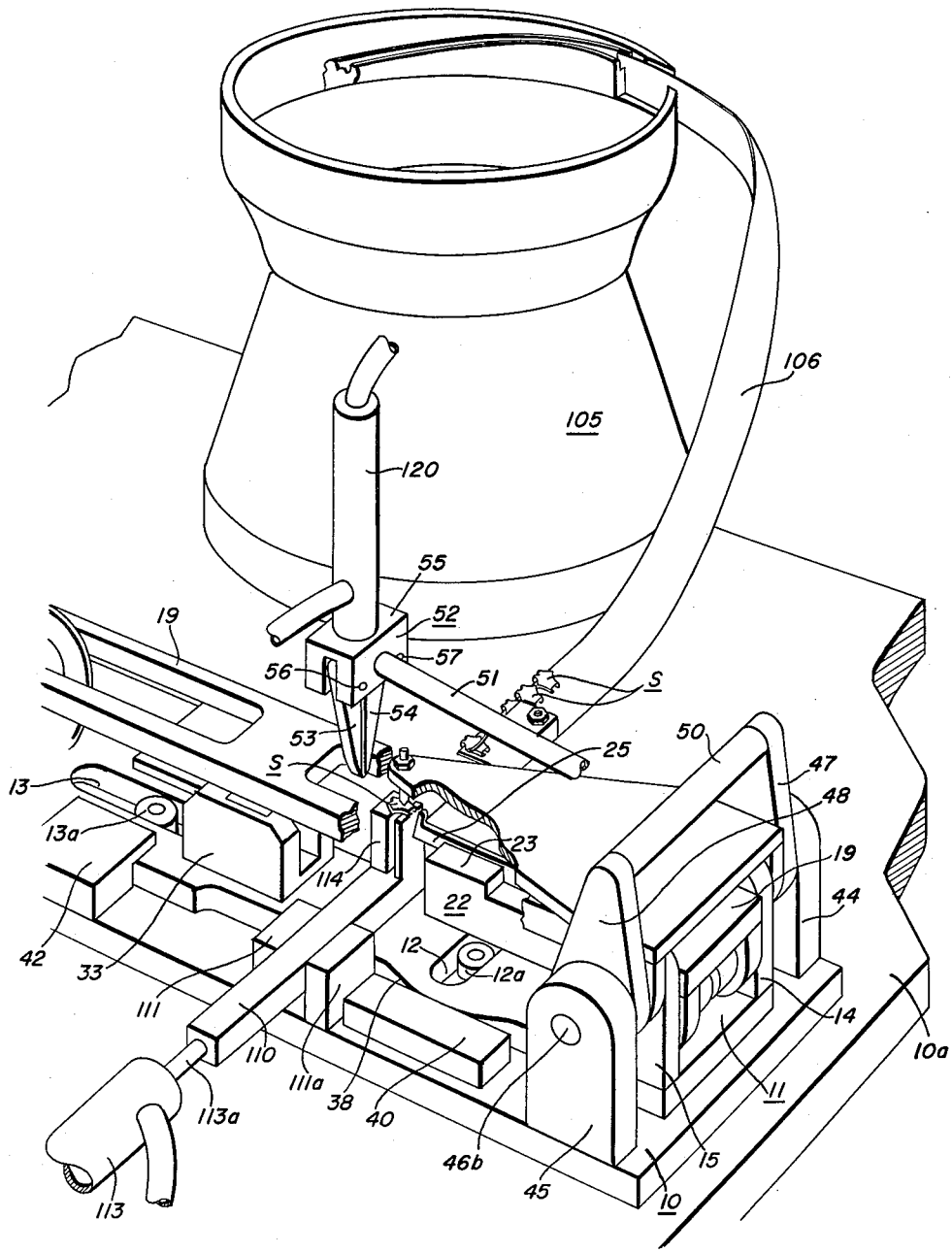
FIGS. 2A and 2B are similar partial perspective views of said apparatus which show the upper clamping arm in its lowered or working position.
Figure 2B:
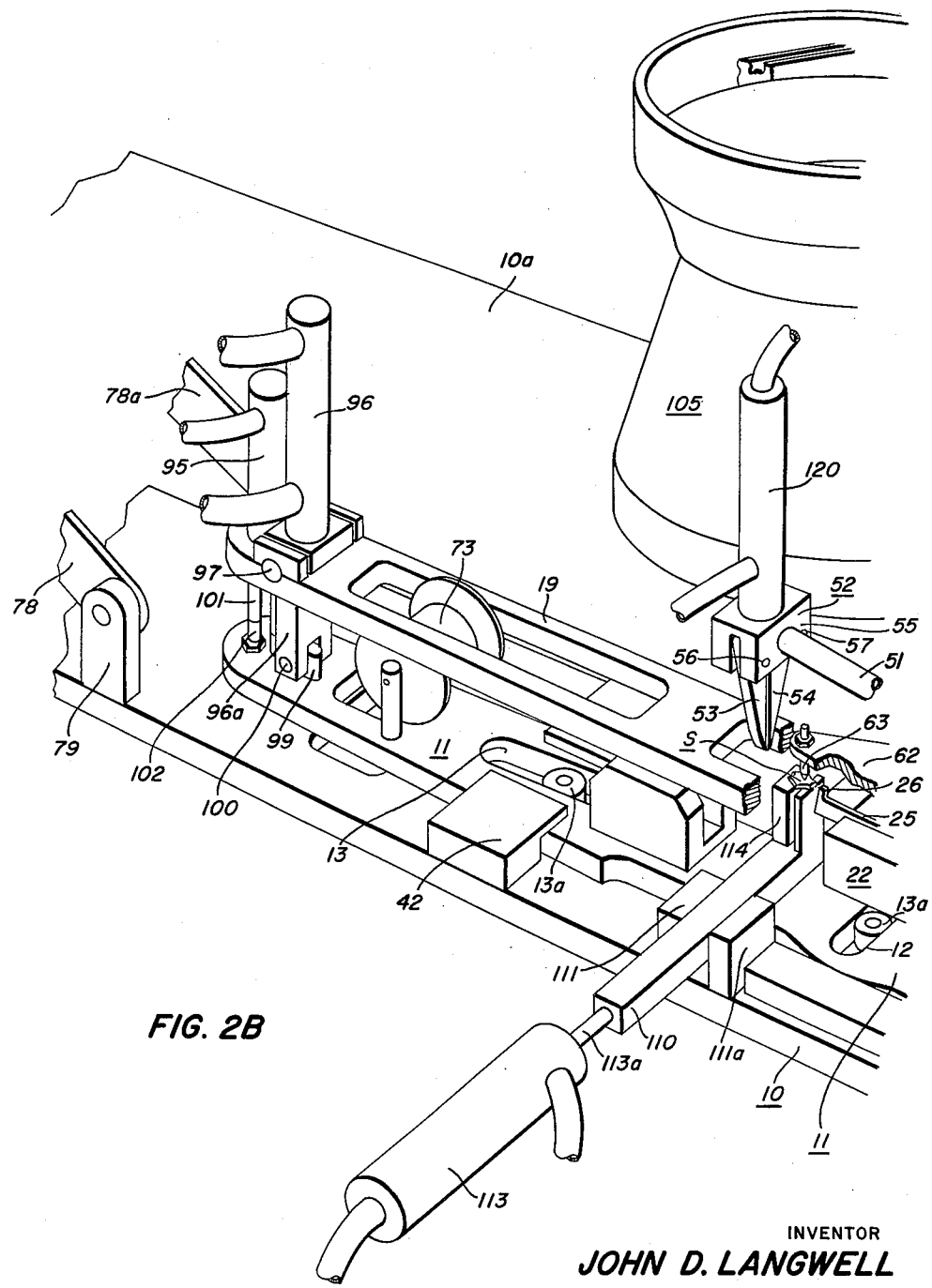

As best seen in FIG. 1A, the underface areas of the clamping arm 19 which are designated X and Y provide rearward and forward upper clamping faces or jaws, respectively, and it is noted that said clamping arm is provided with a window or opening O¹ disposed between said clamping faces and also with a similar opening or window O² disposed forwardly of the clamping face Y. Also provided on the underface of the clamping bridge 19 is a pair of confronting L-shaped guide blocks 20, 21 which serve as retaining guides for the continuous chain of slide fasteners designated C which is threaded lengthwise through the machine in the manner best illustrated in FIG. 3.

Also mounted for swinging movement on the cross shaft 16 is a lower clamping member 22 having a forward raised end which is bifurcated to provide laterally spaced, upwardly disposed, clamping faces 23, 24 together adapted to cooperate with the aforesaid clamping face X of the clamping arm 19 in providing a rearward clamping point for the continuous chain C feeding through the machine. The slot-like space between said clamping faces 23, 24 provides for the reception of a blade-like lever 25 also swingably mounted on the shaft 16 and carrying at its forward end, which projects substantially beyond the forward end of said lower clamping member 22, an upwardly directed chain-stop finger 26 whose action will be later explained.

By reference to FIG. 3, the lower clamping arm 22 is spring-biased in upward direction as by means of a spring 28, but its upward movement is limited by a stop pin 29. Similarly, the lever 25 is biased to move upwardly relatively to the lower clamp member 22 as by a spring 30, but such movement is limited as by means of a stop pin 31.

Also affixed to and extending upwardly from the slide carriage 11 is a pair of laterally spaced housings 32, 33 which are positioned so as to generally underlie the aforesaid forward clamping face Y. Said housings mount spring-urged clamping blocks 34, 35, respectively, which are inclined by a small angle in rearward direction so that, when depressed by movement of said clamping face Y against their upper clamping faces, said blocks tend to move a slight distance forwardly with the fastener chain disposed between said clamping arm and the jaws. At this point it will be observed that the jaw face Y of the clamping arm and the aforesaid spring-urged clamping blocks 34, 35 define a forward clamping point for said fastener chain.

The slide carriage 11 mounting all of the so-far described parts is provided along both side edges and at points near its rearward end with arcuate fulcrums 37, 38 which are struck from a common center so that they are adapted to roll on the inner vertical edges of the laterally spaced fulcrum blocks 39, 40 against which they engage as is best seen in FIG. 1A. Preferably the forward end portion of the slide carriage extends beneath a pair of guide and hold-down blocks 41, 42. Thus, the carriage is effectively guided in its longitudinal and sidewise motion imparted thereto by said eccentrics 12a, 12b.

The rearward end of the base 10 mounts laterally spaced upright bearing ears 44, 45 (which are disposed generally outwardly of the aforesaid bearing ears 14, 15) in which are journaled coaxial stub shafts 46a, 46b mounting spaced arms 47, 48 interconnected by a cross bar 50 constituting a swing bracket. Affixed to said cross bar is a forwardly extending arm 51 mounting at its forward end a tape-spreading means generally designated 52 including spreadable jaws 53, 54 pivotally connected to a frame or block 55 as by means of pins 56, 57, respectively. When the machine is in operation, said swing bracket and tape-spreading means are together swung to its active position shown in FIG. 2A in which the lower working ends of said spreading jaws 53, 54 extend downwardly through the window O¹ of the aforesaid clamping arm 19. Means for locking the swing bracket in its active position aforesaid may be provided, such comprising a locking pin 58 carried by the aforesaid base-carried bearing ear 45 for insertion into a hole (not shown) provided in the bracket arm 48. Such provides that upon withdrawal of the locking pin 58, the swing bracket and tape-spreading means may be swung to an inactive position shown in FIG. 1A.

Also pivotally mounted on the aforesaid stub shafts 46a, 46b just inwardly of the mounting arms 47, 48 of the aforesaid swing bracket are the depending bearing ears 60, 61 of a presser plate 62 which, as best seen in FIG. 2A, extends forwardly over the rearward end of the clamping arm 19. At its forward end, the presser plate 62 carries a pointed finger 63 which, in the operating position of said presser plate, is adapted to project through said rearward window or opening $O^1$ of the clamping arm and thereupon to press down on a slider positioned beneath the chain C for the tape threading-in operation, as will be later described in greater detail. As seen in FIG. 1A, the presser plate is connected to the depending mounting ears 17, 18 of the clamping arm 19 by means of coil springs 70, 71. Accordingly the presser plate 62 tends to follow the clamping arm 19 as the latter moves or is actuated to its various positions as aforesaid.

Referring now to FIGS. 3–4C, which illustrate a preferred chain feed means according to the invention, the chain C upon entering the rearward end of the machine is threaded through the space between the upper clamping arm 19 and the lower clamping member 22, thence proceeds forwardly over a guide roller 73 mounted on the forward end of the slide carriage 11, thence downwardly through aligned openings therefor provided in each of the slide carriage, machine base 10, and table 10a, whereupon it passes under weighted roller 74 and thence proceeds upwardly under a normally higher-level roller 75, and then over powered roller 76 against which it is pressed by a downwardly biased roller 77 carried at the free outer ends of arms 78, 78a pivotally connected to upright posts 79, 79a mounted on the base plate 10a laterally of the forward end of the slide carriage 11. The aforesaid roller 76 is powered by a variable speed electric motor 80 fixedly mounted on the forward end of the base plate 10a and the drive from said motor to said roller is through a transmission (not shown) activated by a pivotally mounted control lever 81 normally biased to its rightmost position (FIG. 3) as by an extensible tension spring 82 reactive between the free upper end of said lever and an upright post 83 extending from the base 10a. When said control lever 81 is in its aforesaid normal (rightmost) position in which it is shown in FIGS. 3 and 4A, the speed of the motor is highest, but as said lever is actuated to the left against the increasing tension of spring 82, the speed of the motor and hence of the powered roller 76 is gradually retarded until it finally reaches zero when said lever is in its extreme left position.

The action of the roller 74 under which the chain travels is that of taking up any slack in the chain and also of forming therein a loop of a length proportional to the length of the individual slide fasteners making up the continuous chain thereof. At this point, it is also explained that when the rearward or trailing part of the chain is stopped for the application of a slider thereto and the forward part of the chain traveling is still being propelled at top speed by motor 80 and powered roller 76, the loop formed by the weighted roller 74 will shorten, as in turn results in said roller rising which it will if permitted to do so. According to the invention, this rising motion of said roller 74 is utilized to effect deceleration and finally a momentary stopping of the motor and driving roller 76.

More particularly, to the upper free end of the speed-control lever 81 is connected a downwardly-forwardly curved rod 84, to whose lower end is pivotally connected the forward end of a double-arm rock lever 85 disposed beneath the table 10a and pivoted substantially at its mid point by means of a pivot pin 86 to a depending fixed bracket 87 carried by said table substantially beneath the motor 80. Said pivot pin 86 preferably also mounts a rearwardly extending arm 87 whose free rearward end carries the aforesaid weighted roller 74, said arm also mounting the aforesaid normally higher-level roller 75 under which the chain passes prior to running over the powered roller 76. At its free end said rock lever 85 carries a laterally extending pin 88 which projects into the path of upward swinging movement of the arm 87.

The aforesaid arrangement provides that the forward propulsion of the chain is retarded and thereupon finally stopped responsive to the rearward or trailing end of the chain being positively clamped and held against movement. Such follows from the fact that, as the chain loop passing under the weighted roller 74 shortens with clamping of the rearward end of the chain, arm 87 moves upwardly against pin 88 (as in FIG. 4B) and thereby rocks lever 85 in counterclockwise direction, as exerts pull in leftwise (counterclockwise) direction on the motor control arm 81 against the tension of spring 82, via the downwardly-rearwardly curved rod 84 operative between said control arm and the forward end of said rock lever (as in FIG. 4C).

Since the amount of chain that forms the loop should equal the length of the individual slide fasteners making up the chain and which may vary from chain to chain, it is very desirable to be able to adjust the length of the loop to that of the individual slide fasteners incorporated into the particular run of chain then being operated upon. To this end there is secured to the under face of the table 10a, in the vertical plane and disposed immediately above the forward end of the rock lever 85, a spoked wheel 90 whose radially protruding spokes 91a–91f inclusive have increasing length and which, by selective engagement with the upper edge of the forward end of said rock lever determine the angular position of the speed control lever 81 and correspondingly the speed of the motor 80, and thereby the amount of chain making up the loop. For example, if the wheel 90 is turned so that its shortest length spoke 91a abuts the upper edge of the rock arm as shown, the speed control lever is in its rightmost position and accordingly the motor runs at maximum speed and the length of the loop and thereby of the zipper or slide fastener is greatest. Conversely, if the wheel 90 is turned so that its longest spoke 91f abuts rock arm 85, the speed control lever 81 is moved to its leftmost position, resulting in the motor turning at a slower speed and in a correspondingly shorter-length loop and slide fastener.

By reference to FIGS. 6A–6E, the aforesaid clamping arm or bridge 19 in the operating position of the parts has a maximum raised position (FIG. 6D) in which it is inclined at an angle of 8° to the horizontal plane of the carriage 11 which mounts said arm, an intermediate raised position (FIGS. 6A, 6B and 6E) in which it is inclined at an angle of approximately 3° to said slide carriage 11, and a full lowered or depressed position (FIG. 6C) in which it is substantially parallel to said carirage, in which latter position it exercises full clamping action on the chain as secures the rearward end thereof against forward movement even when said forward end is still being propelled by the aforesaid chain-drive roller 76. Positive lifting of the clamping arm 19 from its full lowered position to its maximum raised position (as takes place immediately following completion of a slider applying operation) and lowering of said arm from its intermediate position to its full lowered or clamping position (as takes place immediately upon forward motion of the trailing end of the chain being stopped by the chain-stop finger 26) is preferably effected by the air cylinders 95, 96, respectively, mounted on the forward end of said clamping arm 19 and reactive against the corresponding forward end of the slide carriage 11. Preferably, the clamping-arm lowering cylinder 96 is pivotally connected to the clamping arm as by means of a pin 97 whereby said air cylinder may tilt relative to said arm as the latter partakes of its limited lowering and raising movement. Illustratively, the piston rod of the piston operating in the cylinder 96 is rigidly connected to a fork-like connector member 96a which is normally fastened to a combination stud and bracket part 98, 99 affixed to the upper face of the slide carriage 11 (FIG. 1B) as by means of a removable pin 100, with removal of said pin allowing the clamping arm to be freely raised to its inactive position in which it is shown in FIG. 1A and the stud 98 serving to prevent excess lowering of the clamping arm 19. The piston rod 101 of the clamping-arm lifting cylinder 95 engages on an adjustable-height stud 102 affixed to and projecting upwardly from the forward end of the slide carriage 11. The valves for admitting and exhausting compressed air to and from the cylinders 95, 96 are controlled by micro-switches in a well known manner. In this connection, it is explained that during its upward travel, the loop-forming weighted roller 74 or the arm 87 carrying same (FIG. 3–4C) contacts the one of said micro-switches which controls the admisison of compressed air to the clamping-arm lowering cylinder 96, as effects depression of the clamping arm 19 from its aforesaid 3° angular position to its full-lowered clamping position as aforesaid. On the other hand, the micro-switch which controls admission of compressed air to the clamping arm lifting cylinder 95 is preferably positioned so as to be engaged by the carriage 11 upon the latter having completed its full cycle of movement as will be later explained in relation to FIGS. 7–7E inclusive.

Referring particularly to FIGS. 1A, 2A and 5–5F, which illustrate the herein provided means for automatically feeding the sliders one at a time to the element-free tape portions of the continuous slide fastener chain, such preferably comprises a hopper 105 constituting a source of slider supply which delivers said sliders to a flexible blade-form chute 106 whose delivery end, which is horizontally disposed and terminates just to one side of the apparatus bed plate 10, is movable in vertical direction as by means of a piston rod 107 (FIGS. 5A–5F) of an air cylinder (not shown). The sliders designated S position themselves in side-by-side and in edge-straddling relation and with their rear wings facing upwardly on the chute 106. Thus, the sliders reaching the delivery end of the chute have their pull tabs hanging downwardly therefrom, as shown. The endmost slider positioned on the chute is lightly held in proper position thereon as by a spring 108 extending downwardly from a block 109 (as best seen in FIG. 1A).

The sliders S are individually removed from the chute 106 and brought to a temporarily fixed position beneath an element-free tape portion of the chain by means of a reciprocating slide 110 extending transversely across the bed plate 10 and slide carriage 11 at a location intermediate the forward clamping members 23, 24 and the companion rearward clamping jaws 34, 35. The slide 110 operates in laterally spaced pairs of guide blocks 111, 111a and 112, 112a, affixed to the upper face of the bed plate to the sides of the slide carriage 11 and is actuated throughout its reciprocatory travel by means of an air cylinder 113 and its piston rod 113a which latter connects directly to said slide.

Intermediate its ends the slide is provided with an upright slider-supporting post 114 provided in its upper face with a slider-receiving recess or nest 115 and with a transverse slot 116 communicating with said recess for the reception of the pull tab of a slider received in said recess.

The motion of the slide 110 is coordinated with that of the delivery end of the chute 106 to the end that, with the slide at the limit of its forward stroke (in its rightmost position as in FIG. 5D), lowering of the delivery end of the chute 106 (from its FIG. 5D to its 5E position) acts to deposit the endmost slider S on the chute 106 and its depending pull tab into the slider recess 115 and slot 116, respectively, of the slider-receiving post 114. Thereupon, the slide 110 in partaking of its return or retracting motion withdraws said endmost slider from the chute 106 and moves it across the slide carriage 11 to a position in which it is disposed directly beneath and slightly spaced from a tensioned tape portion designated T in FIGS. 5A–5F which is ultimately to be threaded into the channel of said slider in the manner shortly to be explained in connection with FIGS. 7–7H inclusive.

*Operation*

While it is believed that the method of and apparatus for applying sliders to the individual slide fasteners of a continuous chain thereof according to the invention will be readily understood from the foregoing, such will be briefly summarized as follows:

The apparatus is set up for operation by inserting the free end of the continuous chain drawn from a reel or roll supply thereof, for example, between the upper clamping arm 19 (to which it will be held by the guides 20, 21) and the lower clamping member 22 and thence passing it over roller 73, under weighted roller 74 and companion roller 75, and finally over the driving roller 76 against which it is pressed by the presser roller 77. The chain is longitudinally adjusted for the start of the slider applying cycle and thereby an element-free portion extends between the spaced coacting upper and lower clamping jaws X, 23, 24, and Y, 34, 35, respectively, and hence over a slider S which has moved beneath said element-free portion to its fixed applying position in which it is supported in the recess 115 of the slide post 114 with its rear wing upwardly disposed and its pull tab extending downwardly into the slot 116 of said post. At the start of the cycle, the clamping arm 19 will be in its intermediate raised (3°) position (FIG. 6A prior to the slide 110 moving a slider into its fixed applying position and FIG. 6B after the slider has been so positioned) which it assumes when free to do so, and accordingly the chain-stop finger 26 is in its active position in which, consequent to the aforesaid chain positioning, it abuts the forward end of the slide fastener immediately following said element-free tape portion disposed in the clamping position. Also, the weighted roller 74 will be in its full lowered position (FIGS. 3 and 4A) in which it forms a predetermined length of loop in the chain, as previously explained, and also maintains the chain length extending between roller 74 and the chain stop finger 26 under substantial tension.

Upon motor 80 being energized, the forward end of the chain is positively pulled through the machine against the stopped rearward end thereof, whereupon the chain loop shortens and the weighted roller 74 rises with such shortening of the chain. In rising as aforesaid, the weighted roller actuates the aforementioned microswitch (not shown) which controls operation of air cylinder 96 which latter, when placed in operation, positively lowers the clamping arm from its intermediate raised (3°) position to its full lowered or clamping position (0° as in FIG. 6C), thereby to effect positive clamping of the element-free tape portion then over the slider to be applied at spaced rearward and forward points thereof defined, respectively, by the aforesaid clamping jaws X, 23, 24 and Y, 34, 35. Such movement of the clamping arm 19 to its full lowered position also effects limited lowering movement of the clamped element-free portion of the tape, and it will also be observed that, consequent to the inclined disposition of the clamping jaws 34, 35 in their guide blocks or housings 32, 33, retraction of said jaws into said housings responsive to lowering of the clamping arm thereon results in said clamping jaws moving a slight distance in forward direction, as exerts added tension on the clamped element-free tape portion, thereby to satisfy the prerequisite of the method that the individual tapes of the element-free portion which are to be threaded into the slider positioned to receive same must be positively clamped and firmly tensioned in endwise direction, thereby to guard against any uncontrolled movement of said tapes.

Figure 5:
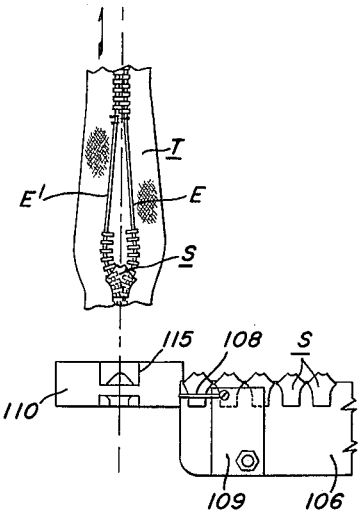
FIG. 5 is a partial plan view, and FIGS. 5A–5F inclusive are diagrammatic end views of the slider feed and positioning means.
Figure 5A:
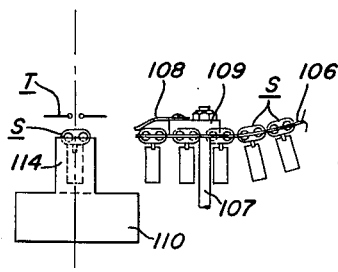

The operation of the slider feed and positioning means is of course coordinated with the aforesaid tape-clamping and lowering action of the clamping arm 19 and related parts. In explanation thereof (here referring to FIGS. 5A–5F), FIG. 5A illustrates a slider S, an overlying element-free portion of the tape designated T, and the slider feed chute 106 at the moment when the slide 110 has stationarily positioned a slider S to be applied beneath said tape for the tape-into-slider threading operation. At this moment, the tape T has not as yet been tensioned and lowered against said slider and the slider chute 106 is still in its relatively lowered position which it assumes for foremost slider withdrawal therefrom, as in FIG. 5F. Also to be observed is that the slider pull tab is fully accommodated in the slot 116 of the slider supporting post 114 (FIG. 1A), and hence with the smooth rear slider wing facing upwardly.

Figure 5B:
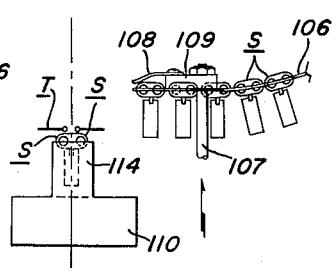

FIG. 5B illustrates the delivery end of the slider chute 106 as having moved upwardly to its normal position and the tape T as having been pressed downwardly against the upper (rear) slider wing responsive to full lowering of the clamping arm 19.

Figure 5C:
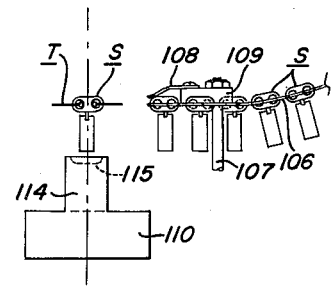
Figure 5D:
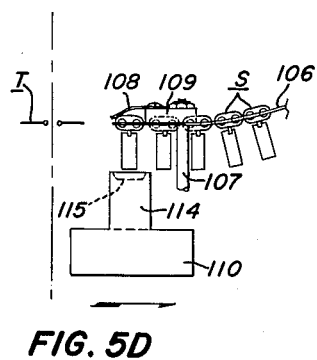

FIG. 5C (as does FIG. 5 also) assumes that the slider-applying cycle has just been completed, and hence illustrates the tape T as having been lifted (by movement of clamping arm 19 to its maximum raised position, FIGS. 3 and 6D, as results from air cylinder 95 having been placed in operation) an amount such that the pull tab is now disposed above the slide post 114, whereupon the slide 110 is free to begin its travel towards the delivery end of the chute 106 to its FIG. 5D position in which the slider post 114 is disposed directly below the slider next to be withdrawn.

Figure 5E:
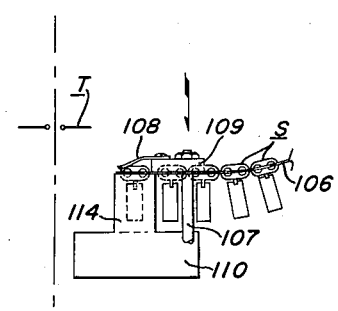
Figure 5F:
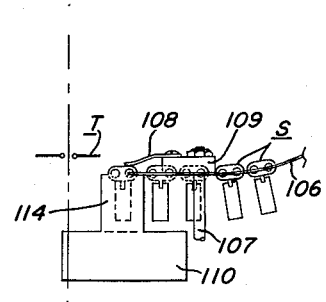

Referring to FIG. 5E, such illustrates the delivery end of the chute as having lowered an amount as deposits said next-to-be-withdrawn slider S into the recess of the slide post 114 and further shows the tape T still in full raised position but about to lower to its FIG. 5F position. In FIG. 5F, the tape is shown in its intermediate or FIG. 5A position and the view further illustrates the slide 110 as about to begin its retracting motion as will bring the slider deposited in its post recess 115 beneath the tape T, as in FIG. 5A.

Upon stopping of the chain and positive clamping and tensioning of an element-free tape portion T thereof disposed above a slider S in position to be applied having been effected, lowering of said tape portion against the slider, in conjunction with both the longitudinal and lateral movement imparted to the clamped element-free tape portion, effects threading of the individual tapes making up same into the slider channel, as will now be explained in connection with FIGS. 7–7H inclusive, it being here observed that FIGS. 7 and 7H are essentially identical, the difference being that FIG. 7 is intended to show the position of the parts at the beginning of the cycle and FIG. 7H such position at the end of the cycle.

Referring first to FIG. 7, which also illustrates in detail the aforementioned eccentric and driving means for effecting limited longitudinal and lateral motion of carriage 11 (roller 12a eccentrically mounted on pulley P2 and operating in carriage slot 12 and roller 13a eccentrically mounted on driving pulley P1 and operating in carriage slot 13), it is explained that, assuming pulley P1 to have twice the diameter of pulley P2, as shown, the carriage 11 will move back or forth in longitudinal direction its full stroke (as determined by the eccentricity of roller 12a to pulley P2) with each 180° rotation of the larger diameter driving pulley P1; and also that two full revolutions of the pulley P1 are required to effect each tape-into slide threading operation according to the invention.

The cycle of carriage movement starts immediately upon the clamped element-free tape portion lowering against the slider to be applied, and with said carriage 11 being disposed in its most forward (leftwise) position as positions the slider S immediately adjacent the forward end of the slide fastener to the rear of the element-free portion to be threaded into said slider, and also with the carriage being "on-center" with respect to the longitudinal center line of both said slider and the continuous chain of fasteners extending through the apparatus. As seen in FIG. 7A, a 90° rotation of pulley P1 effects 180° rotation of the eccentric 12a as in turn effects full rearward movement of the carriage, accompanied by a slight lateral shift of the relatively forward end thereof to one side of the apparatus center line. This rearward motion of the carriage is such as to effect a corresponding rearward shift of the element-free tape portion clamped to said carriage by an amount such that the mouth end of the slider (as defined by its element-entrance openings spaced by the divider) is now positioned adjacent the trailing end of the next forward individual slide fastener of the chain, and the limited lateral shift of said carriage to one side of the machine center line in effect moves the inner edge designated E of one of the tapes of said element-free tape portion downwardly over the corresponding side of the slider to the level of its slider side opening and hence in registry with said side opening.

The following 90° rotation of pulley P1 returns the slide carriage 11 to its FIG. 7B position, which it will be observed is identical with its starting (FIG. 7) position although the eccentrically mounted roller 13a is now turned 180° from its FIG. 7 position. Such return movement results in the clamped element-free portion moving forwardly with respect to the slider and also in said carriage and the clamped element-free portion returning to its "on-center" position, as effects partial threading of said tape edge E into the slider channel, i.e. into the mouth end of the slider side opening with which it has previously registered. The next following 90° rotation of the pulley P1 results in the slide carriage again moving its full distance rearwardly and in its forward end being shifted sideways but to the side of the machine center line opposite that to which it had been previously moved, all as shown in FIG. 7C. Such results both in movement of tape edge E well into the slider channel and in the opposite tape edge $E^1$ moving over the opposite side of the slider and being brought into registry with the side opening on that side of the slider. The final 90° motion of the pulley P1 (which completes one full revolution thereof) returns the carriage and actuating eccentrics to the FIG. 7D position (identical with the FIG. 7 position), during the course of which the tape edge $E^1$ moves into the mouth end of said slider side opening with which it has previously been brought in registry.

The next 90° rotation of the pulley P1 (now starting its second revolution of the cycle) results in the slide carriage moving relatively rearwardly and in its forward edge being shifted to one side of the machine center line, as in FIG. 7E, as causes said tape edge $E^1$ to move fully into the slider channel. Here it is observed that the slide carriage has the identical position which it had in FIG. 7A but now both tape edges E and $E^1$ are threaded into the slider channel. The next 90° rotation of pulley P1 brings the slide carriage to its FIG. 7F position in which not only are the tape edges fully threaded through the slider channel but also the slider is disposed with its element-exit end immediately adjacent the forward end of the next following slide fastener of the chain on which it is to be pushed as will be next explained. The two following 90° rotations of the pulley P1, which bring the slide carriage and related parts first to the FIG. 7G position and thereafter to the FIG. 7H position, serve to return the eccentrically mounted rollers 12a, 13a, to their respective cycle-starting positions shown in FIG. 7.

The final operation according to the herein slider applying method and apparatus is that of pushing the slider having the element-free tape portions fully threaded into its channel (as in FIG. 7H) rearwardly on to the next following slide fastener of the chain with forward motion of the latter, as will now be described in connection with FIGS. 8A–8E supplemented by FIG. 8A¹–FIG. 8E¹ which are corresponding side elevational views of the slider push-on means and related parts. More particularly, FIGS. 8A and 8A¹ illustrate the slider S still held in its supporting post 114 immediately following completion of the tape threading operation, and with the earlier referred to spreader jaws 53, 54 in their raised, inactive position. Said jaws are lowerable as a unit to their active position as by means of an air cylinder 120

(FIG. 2A) to which operating air is supplied upon completion of the tape-into-slider threading operation by suitable valve means (not shown). In their lower lowered active position, the spreader jaws 53, 54 are adapted to move into the longitudinal opening between the individual tapes of the element-free tape portion forwardly of the slider S whereby, upon being spread, the jaws enlarge the opening in lateral direction, as in turn causes movement of the slider in fastener-opening direction along a short-length portion of the next following slide fastener of the chain.

The aforesaid lowering movement and spreading action of the spreader-jaw unit is timed to take place with the positive continuous raising movement of the clamping arm 19 from its full lowered or chain clamping position to its maximum raised (8°) position during which it perforce moves upwardly through its intermediate (3°) position. More particularly, the tips of the spreader jaws 53, 54 of the lowering spreader unit initially move into the slot-like opening defined by the element-free edge portions of the tapes T forwardly of the now applied slider S at about the instant that said tapes follow the clamping arm through its 3° position and while the chain stop finger 26 is still exercising its chain stop-function, as in FIGS. 8B and 8B¹. However, since with further raising of the clamping arm the chain stop finger is rendered inactive, forward motion of the chain C is resumed and, simultaneously therewith, the spreading jaws are themselves spread preferably by means of a jaw-spreading pin 122 which, when projected downwardly, abuts two oppositely arranged cam faces (not shown) on said jaws, thereby causing the tip ends of the jaws to open. As analysis of FIGS. 8D and 8D¹ in relation to FIGS 8C and 8C¹ will show, the combined effect of the aforesaid tape movement and the opening of the spreader jaws 53, 54 is to spread the individual tapes forwardly of the slider as tends to push the latter rearwardly onto the next following slide fastener. Considering that forward chain motion has been initiated, such insures that the slider moves onto the now on-coming slide fastener a sufficient distance as to insure its full retention thereon with slight further chain movement, it being explained that such effects a partial opening of said on-coming slide fastener, as is illustrated in FIG. 8D. Upon the slider being fully engaged with the on-coming slide fastener, the jaws 53, 54 are closed and raised from the tape to their normal inactive position (FIGS. 8E and 8E¹) in which they remain until called upon to perform the next tape-spreading operation.

Without further analysis, it will be appreciated that the slider-applying method and apparatus described in the foregoing achieves the objectives of the invention as previously explained in thoroughly dependable and effective manner. In its method aspects, the invention provides a precision, fully mechanized, high-speed procedure for applying sliders to individual slide fasteners of a continuous chain thereof. In its apparatus aspects, the invention provides a fully automatic and high-speed yet thoroughly dependable piece of apparatus for applying slide fasteners to each of the element-free portions between the individual slide fasteners making up a so-called continuous chain thereof, which not only completely mechanizes the previously time-consuming and laborious slider-applying operation but also performs same at a speed which insures the high-speed quantity production of the complete slide fastener units required by present-day high-speed production techniques.

As many changes could be made in carrying out the above method and constructions without departing from the scope of the invention, it is intended that all matter contained in the above description or shown in the accompanying drawings shall be interpreted as illustrative and not in a limiting sense.

I claim:

1. In apparatus for applying sliders to the slide fasteners of a continuous chain of such fasteners arranged on the same tapes and being spaced from one another by element-free tape portions, the combination of a fixed base, means operatively associated with said base for feeding the continuous chain in a longitudinal path extending over said base and with a step-by-step motion, means mounted on said base for feeding a slider to be applied to a predetermined fixed position on said base in which it is disposed intermediate the base and the chain and is horizontally arranged and has its center line in parallelism with the path of chain motion whereby its side openings open to the sides of said path, means interrelating the feed motion of the continuous chain and the slider to be applied in such manner that the chain is stopped when an element-free portion thereof is disposed immediately above the so positioned slider, means for tensioning said element-free portion from points disposed forwardly and rearwardly of the slider, and means for positively lowering said tensioned element-free portion against the upwardly disposed face of said slider and including mechanism for imparting limited longitudinal and sidewise movement in both directions to said tensioned element-free portion relatively of said slider whereby first the one and then the other of the inner edges of the individual tapes thereof are brought into alignment with and thence threaded through the side openings of the slider into the channel thereof.

2. In apparatus for applying sliders to the slide fasteners of a continuous chain of such fasteners arranged on the same tapes and being spaced from one another by element-free tape portions, the combination of a fixed base, an elongated carriage supported on said base for movement relative thereto, means for feeding the continuous chain in a longitudinal path extending over said elongated carriage and with a step-by-step motion, means temporarily mounting a slider to be applied in predetermined fixed position on said base in which it is disposed intermediate said carriage and the chain and is horizontally arranged and has its center line in parallelism with the path of chain motion whereby its side openings open to the sides of said path, means on said carriage for stopping the chain in position such that an element-free portion thereof is disposed immediately above said so-positioned slider and for tensioning said element-free portion from points disposed forwardly and rearwardly of the slider, and means for positively lowering said tensioned element-free portion against the upwardly disposed face of said slider and including mechanism for imparting limited longitudinal and sidewise movement in both directions to said carriage and thereby to said tensioned element-free portion relatively to said slider whereby first the one and then the other of the inner edges of the individual tapes of said element-free portion are brought into alignment with and thence threaded through the side openings of the slider into the channel thereof.

3. Apparatus according to claim 1, wherein the slider positioning means also disposes the slider with its mouth end forward, and said apparatus further includes means operative upon completion of said tape-threading operation for spreading said individual tapes at points forwardly of the slider thereby effectively to move the latter a small predetermined distance on to the next following slide fastener.

4. Apparatus according to claim 2, wherein the slider positioning means also disposes the slider with its mouth end forward, and said apparatus further includes means operative upon completion of said tape-threading operation for spreading said individual tapes at points forwardly of the slider thereby effectively to move the latter a small predetermined distance on to the next following slide fastener.

5. Apparatus according to claim 1, wherein the chain-stopping and tensioning means includes a depressible upper clamping arm, coacting lower clamping members and means interrelating the lowering movement of said arm against said clamping members with the feed motion of the chain so as to position an element-free portion of the chain above the slider immediately prior to the full lowering movement of said clamping arm against said clamping members.

6. Apparatus according to claim 2, wherein the means for imparting longitudinal and sidewise movement to said carriage comprises powered eccentrics operating in longitudinal and transverse slots in said carriage.

7. Apparatus according to claim 1, combined with means disposed to one side of the base for arranging a plurality of the sliders to be applied in side-by-side relation and for releasing the endmost slider, and said slider feeding means includes a slide having a post provided in its top face with a slider-receiving recess and being movable transversely across said base between a first position in which said post is disposed beneath said endmost slider which it receives in its recess and a second position in which it fixes said slider with its center line in parallelism with the chain as aforesaid.

8. Apparatus for automatically applying sliders to the slide fasteners of a continuous chain thereof arranged on the same tapes and being spaced from one another by element-free tape portions comprising, in combination, means for feeding such a chain in a longitudinal path with a step-by-step motion, means operative in the interval between each increment of chain-feed motion to fixedly position a slider to be applied immediately beneath an element-free portion of the chain, with the slider being horizontally arranged and disposed with its center line in parallelism with the path of chain motion, means for tensioning said last-named element-free tape portion between points disposed rearwardly and forwardly of said fixedly positioned slider, and means for lowering said tensioned element-free portion against the slider and including mechanism for moving said portion back and forth along and sidewardly in both directions relatively of the slider, thereby to thread first one and then the other inner edge of the individual tapes thereof into the side openings and thence into the channel of the slider.

9. Apparatus according to claim 8, which further includes means operative upon completion of said tape-threading operation for spreading the individual tapes at points forwardly of the slider thereby effectively to push the slider partially on to the next following slide fastener of the chain.

10. Apparatus according to claim 8, which further includes chute means for supplying sliders one at a time to said slider-positioning means and said latter means comprises a slide mounted to reciprocate transversely beneath the chain and including an upright support having a slider-receiving recess in its upper face, said chute means including a chute member having a vertically movable slider-delivery end operative to deposit the endmost slider thereon in said recess, said slide being effective to actuate the slider support between endmost positions in which it is disposed beneath said delivery end and said chain, respectively.

11. Apparatus according to claim 8, wherein the chain feed means is effective on the forward portion of the chain and said tensioning means includes a spring-operated chain-stop finger adapted to enter the opening between the inner edges of the individual tapes of said element-free portion then moving into position over said fixedly positioned slider and thereupon to engage the closed end of the next following slide fastener thereby to stop the forward motion of the rearward portion of the chain-feeding means.

12. Apparatus according to claim 11, wherein said tensioning means further includes upper and lower chain-clamping members adapted to clamp to said chain at spaced points thereof as aforesaid in response to a predetermined tensioning of the chain responsive to its rearward end being stopped as aforesaid.

13. Apparatus according to claim 12, wherein said upper clamping member comprises a swingably mounted clamp arm extending longitudinally over the chain and the fixedly positioned slider and to which said chain is attached, said arm being movable to and from three different angular positions and thereby determining the angularity of the chain portion attached thereto, said clamping arm in its highest position lifting the chain above the stop finger whereby it may be fed forwardly, and in its intermediate position disposing the chain at a level such that said stop finger is active, and in its lowest position coacting with the lower clamping members to clamp said element-free portion tensioned between spaced points as aforesaid.

14. Apparatus according to claim 11, wherein said chain-feeding means includes a chain-pulling roller, an electric motor driving said roller and means for retarding the speed of the motor in accordance with the tension applied to the chain.

15. A method of applying sliders to the slide fasteners of a continuous chain of such fasteners arranged on the same tapes and being spaced from one another by element-free tape portions, which comprises the steps of: feeding the chain in longitudinal direction with a step-by-step motion, feeding a slider to be applied from a supply station to a fixed position beneath the chain in which it is horizontally arranged and has its center line disposed in parallelism with the path of motion of the chain whereby its side openings are disposed to opposite sides of said path, coordinating the feed motion of the chain with that of the slider so as to dispose an element-free tape portion thereof above the fixedly positioned slider when the chain is stopped, tensioning said element-free portion against the slider and between points disposed forwardly and rearwardly of said slider, and threading first one and then the other of the inner edges of the individual tapes of said element-free portion through the side openings and thence into the channel of the slider.

16. A method of applying sliders to the slide fasteners of a continuous chain of such fasteners arranged on the same tapes and being spaced from one another by element-free tape portions, which comprises the steps of: feeding the chain in longitudinal direction with a step-by-step motion, feeding a slider to be applied from a supply station to a fixed position beneath the chain in which it is horizontally arranged and has its center line disposed in parallelism with the path of motion of the chain whereby its side openings are disposed to opposite sides of said path, coordinating the feed motion of the chain with that of the slider so as to dispose an element-free tape portion thereof above the fixedly positioned slider when the chain is stopped, tensioning said element-free portion against the slider and between points disposed forwardly and rearwardly thereof, positively lowering said element-free tensioned portion against the upwardly disposed face of the slider and imparting limited longitudinal and sidewise movement to said tensioned element-free portion in such manner that first one and then the other of the inner edges of the individual tapes thereof are brought into alignment with and thence threaded through the side openings of the slider into the channel thereof.

17. The method according to claim 15, and the further step of spreading the individual tapes at points thereof disposed just forwardly of the slider applied thereto as aforesaid, thereby effectively to push the slider rearwardly on to the next following slide fastener of the chain.

18. The method according to claim 16, and the further step of spreading the individual tapes at points thereof disposed just forwardly of the slider applied thereto as aforesaid, thereby effectively to push the slider rearwardly on to the next following slide fastener of the chain.

19. The method according to claim 15, wherein the slider to be applied is further positioned so that its mouth end is disposed forwardly, and the inner edges of the tapes are first threaded through the mouth ends of the slider side openings.

20. The method according to claim 16, wherein the slider to be applied is further positioned so that its mouth end is disposed forwardly, and the inner edges of the tapes are first threaded through the mouth ends of the slider side openings.

References Cited in the file of this patent

UNITED STATES PATENTS 2,219,165 Nedal _____ Oct. 22, 1940
2,879,588 Morin _____ Mar. 31, 1959